United States Patent
Sasaki

(10) Patent No.: US 11,567,709 B2
(45) Date of Patent: Jan. 31, 2023

(54) PRINT MANAGEMENT DEVICE AND COMPUTER READABLE MEDIUM

(71) Applicant: FUJIFILM BUSINESS INNOVATION CORP., Tokyo (JP)

(72) Inventor: Kimihiko Sasaki, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 197 days.

(21) Appl. No.: 16/510,366

(22) Filed: Jul. 12, 2019

(65) Prior Publication Data
US 2020/0034086 A1   Jan. 30, 2020

(30) Foreign Application Priority Data
Jul. 25, 2018 (JP) .............................. JP2018-139801

(51) Int. Cl.
G06F 3/12    (2006.01)
G06F 11/07   (2006.01)
G06F 11/00   (2006.01)

(52) U.S. Cl.
CPC .......... G06F 3/1207 (2013.01); G06F 3/1234 (2013.01); G06F 3/1259 (2013.01); G06F 3/1275 (2013.01); G06F 3/1294 (2013.01); G06F 11/008 (2013.01); G06F 11/0733 (2013.01)

(58) Field of Classification Search
None
See application file for complete search history.

(56) References Cited

U.S. PATENT DOCUMENTS

| 7,722,150 | B2 | 5/2010 | Furukawa et al. |
| 9,329,821 | B2 | 5/2016 | Fukuda |
| 2010/0238484 | A1* | 9/2010 | Komine ................ G06F 3/1226 358/1.15 |

(Continued)

FOREIGN PATENT DOCUMENTS

| JP | 07168684 | * | 7/1995 |
| JP | 09201747 | A * | 8/1997 |
| JP | H09-201747 | A | 8/1997 |

(Continued)

OTHER PUBLICATIONS

Jul. 27, 2020 Office Action issued in Australian Patent Application No. 2019200974.

(Continued)

*Primary Examiner* — Fan Zhang
(74) *Attorney, Agent, or Firm* — Oliff PLC

(57) ABSTRACT

A print management device includes: an estimation unit that estimates a completion prediction time of a print process that is planned in advance according to a processing capability of a printing device, the estimation unit estimating, in response to occurrence of an abnormality in the printing device, the completion prediction time based on actual performance information on the processing capability from a start of printing by the printing device to the occurrence of the abnormality and a recovery time determined in advance, the recovery time being a time needed for dealing with the abnormality; and a notification unit that notifies the completion prediction time estimated by the estimation unit.

20 Claims, 9 Drawing Sheets

(56) References Cited

U.S. PATENT DOCUMENTS

2014/0146339 A1    5/2014   Rai et al.
2016/0092150 A1    3/2016   De Groot et al.

FOREIGN PATENT DOCUMENTS

| JP | 2012-43310 A | 3/2012 |
| JP | 2014-37079 A | 2/2014 |
| JP | 2015-093403 A | 5/2015 |
| JP | 2015-93404 A | 5/2015 |
| JP | 2015-219718 A | 12/2015 |
| JP | 2016-11503 A | 1/2016 |
| JP | 2016-115013 A | 6/2016 |
| JP | 2016-179619 A | 10/2016 |
| JP | 2017-091223 A | 5/2017 |

OTHER PUBLICATIONS

Jul. 30, 2019 Office Action issued in Australian Patent Application No. 2019200974.
May 5, 2020 Office Action issued in Australian Patetn Application No. 2019200974.
May 13, 2021 Office Action issued in Australian Patent Application No. 2020210235.
Ruckstuhl, C., "Why Proper Humidity Control is Vital to Paper and Print Quality Results", May 16, 2018, https://www.piworld.com/post/importance-humidity-control-printing-industry.
Apr. 19, 2022 Office Action issued in Japanese Patent Application No. 2018-139801.
Oct. 11, 2022 Office Action issued in Japanese Patent Application No. 2018-139801.

\* cited by examiner

*FIG. 5*

| PRINTING DEVICE ID | SHEET TYPE | SPECIFIED PRINT CAPABILITY | COLOR TYPE | PRINT METHOD | GROUP |
|---|---|---|---|---|---|
| #1 | ROLL | 1300 | COLOR | INKJET | A |
| #2 | ROLL | 650 | COLOR | INKJET | A |
| #3 | ROLL | 600 | BLACK AND WHITE | TONER | B |
| #4 | ROLL | 250 | BLACK AND WHITE | TONER | B |
| #5 | ROLL | 130 | BLACK AND WHITE | TONER | B |
| #6 | CUT PAPER | 100 | COLOR | TONER | C |
| #7 | CUT PAPER | 70 | COLOR | TONER | C |
| #8 | CUT PAPER | 50 | COLOR | TONER | C |
| #9 | CUT PAPER | 30 | COLOR | TONER | C |

| SHEET TYPE \ SHEET SIZE | ROLL | Letter | A4 | B4 | A3 |
|---|---|---|---|---|---|
| NORMAL SHEET | Y11 | Y12 | Y13 | Y14 | Y15 |
| EMBOSSED SHEET | Y21 | Y22 | Y23 | Y24 | Y25 |
| RECYCLED SHEET | Y31 | Y32 | Y33 | Y34 | Y35 |
| CUSTOM SHEET | Y41 | Y42 | Y43 | Y44 | Y45 |

|  | | TEMPERATURE | | | |
|---|---|---|---|---|---|
|  | | CATEGORY 1 | CATEGORY 2 | CATEGORY 3 | CATEGORY 4 |
| HUMIDITY | CATEGORY 1 | CONDITION 1 | CONDITION 2 | CONDITION 3 | CONDITION 4 |
|  | CATEGORY 2 | CONDITION 5 | CONDITION 6 | CONDITION 7 | CONDITION 8 |
|  | CATEGORY 3 | CONDITION 9 | CONDITION 10 | CONDITION 11 | CONDITION 12 |
|  | CATEGORY 4 | CONDITION 13 | CONDITION 14 | CONDITION 15 | CONDITION 16 |

| ABNORMALITY TYPE | RECOVERY TIME |
|---|---|
| OPERATION MISS | 0.5 |
| PAPER JAM | 1 |
| PAPER FEEDING | 3 |
| CONSUMABLES EXCHANGE | 3 |
| DEVICE CHECK | 4 |
| DEVICE ERROR | 5 |
| ERROR OF PREPROCESSING MACHINE AND POSTPROCESSING MACHINE | 5 |
| INPUT DATA ERROR | 6 |
| RIP ERROR | 7 |
| SYSTEM DOWN | 30 |

28 (28A)

PRINT MANAGEMENT DEVICE AND COMPUTER READABLE MEDIUM

CROSS-REFERENCE TO RELATED APPLICATIONS

This application is based on and claims priority under 35 USC 119 from Japanese Patent Application No. 2018-139801 filed on Jul. 25, 2018.

BACKGROUND

Technical Field

The present invention relates to a print management device and a computer readable medium.

Related Art

JP-A-9-201747 discloses a delay process extracting method of registering the scheduled start time, the scheduled completion time, and the number of scheduled work components of each work process in advance in an electronic calculator as plan information, inputting start time, a progress status at the current time, completion time, and the number of work completion components of each work process to the electronic calculator as actual performance information, causing the electronic calculator to determine the progress status of each work process based on the actual performance information when it is necessary to manage the work process, extracting a delay process by causing the electronic calculator to compare time of the work process with the scheduled completion time of the work process in a case where any one of the work processes is in a completion state, and meanwhile, causing the electronic calculator to calculate completion prediction time of the process based on the number of work completion components up to the current time in a case where any one of the work processes is in a performing state, and extracting the delay process by causing the electronic calculator to compare the prediction time with the scheduled completion time of the work process.

JP-A-2017-91223 discloses an information processing device including acquisition means for acquiring actual performance information relating to actual performance of a predetermined processing process implemented based on a work plan generated by using a profile specifying process time of the predetermined processing process, delay actual performance management means for managing delay information indicating the number of times of actual performance in which delay occurs in comparison with the work plan with respect to the predetermined processing process for N pieces of actual performance information acquired by the acquisition means, and display control means for displaying a new work plan generated by using the profile in a display device, in which the display control unit displays additional information indicating a possibility of a delay in the predetermined processing process with respect to the predetermined processing process included in the new work plan, based on the delay actual performance information.

SUMMARY

In a recent print industry, a progress management of a print process has been promoted in order to deal with print media of different content and the different number of copies for each customer and to deliver the print media produced for a designated delivery date.

In the progress management of the print process, a print plan is often prepared in advance based on a processing capability of a printing device. In a case where a delay occurs with respect to the print plan, an updated completion prediction time of the print process may be newly calculated.

In the progress management of the print process of the related art, however, an updated completion prediction time is calculated based on deviation of a processing capability due to a difference between a theoretical processing capability and an actual processing capability of a printing device. Thus, in a case where a planned print process is influenced by factors other than deviation of the processing capability of the printing device, such as occurrence of abnormality of the printing device or a change of the number of printing devices to be used, calculating the updated completion prediction time of work may be difficult.

Aspect of non-limiting embodiments of the present disclosure relates to provide a print management device and a computer readable medium capable of notifying of completion prediction time necessary for completing print even in a case where a factor other than a deviation of a processing capability of a printing device, influencing a previously planned print process, occurs.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a print management device including: an estimation unit that estimates a completion prediction time of a print process that is planned in advance according to a processing capability of a printing device, the estimation unit estimating, in response to occurrence of an abnormality in the printing device, the completion prediction time based on actual performance information on the processing capability from a start of printing by the printing device to the occurrence of the abnormality and a recovery time determined in advance, the recovery time being a time needed for dealing with the abnormality; and a notification unit that notifies the completion prediction time estimated by the estimation unit.

BRIEF DESCRIPTION OF DRAWINGS

Exemplary embodiment(s) of the present invention will be described in detail based on the following figures, wherein:

FIG. 5 is a diagram illustrating an example of a printing device characteristic table;

FIG. 6 is a diagram illustrating an example of a statistical table;

FIG. 7 is a diagram illustrating an example of an environment condition table;

FIG. 8 is a diagram illustrating an example of a specified recovery time table and a statistical recovery time table;

DETAILED DESCRIPTION

Figure 1:
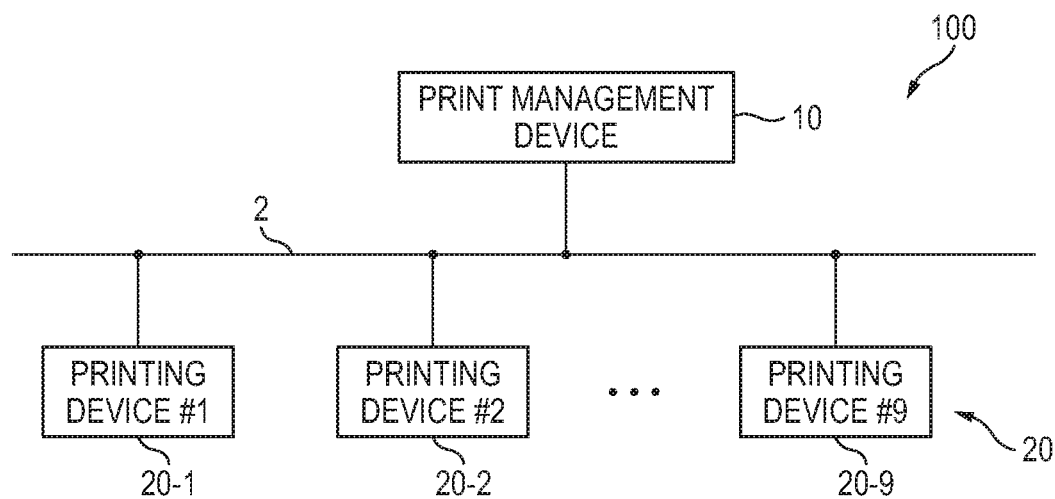
FIG. 1 is a diagram illustrating an example of a print management system.

Hereinafter, the present exemplary embodiments will be described with reference to the drawings. Configuration elements and processing having the same function are denoted by the same reference numerals or symbols through all the diagrams, and redundant description will be omitted.

First Exemplary Embodiment

FIG. 1 is a diagram illustrating an example of a print management system 100 according to the present exemplary embodiment. The print management system 100 includes a print management device 10 and at least one printing device 20, and print management device 10 is connected to the respective printing device 20 through a communication line 2.

The communication line 2 that connects the print management device 10 to the printing device 20 may be a wired line or a wireless line and may be a dedicated line to which only a specific device is connected and may be a public line to which the unspecified number of devices are connected.

Although the example of the print management system 100 of FIG. 1 includes nine printing devices 20 of printing devices 20-1 to 20-9, there is no limit on the number of the printing devices 20 included in the print management system 100. In the present exemplary embodiment, when it is unnecessary to distinguish between the printing devices 20-1 to 20-9, it is referred to as the "printing device 20". For the sake of convenient description, the printing device 20-1 to the printing device 20-9 may be referred to as printing device #1 to printing device #9, respectively. "#N (N is a positive integer)" attached to a rear portion of the printing device is identification information (identification: ID) for uniquely identifying each printing device 20 and called a printing device ID. It is assumed that the printing device ID is preliminarily set in each printing device 20.

The print management device 10 receives various kinds of information relating to an operation from each printing device 20, manages an operation status and a processing capability of each printing device 20, and transmits various instructions such as a stop instruction and a setting instruction for setting an operation of the printing device 20 to the printing device 20.

The print management system 100 may include, for example, a processing device, a post-processing device, a cutting device, and the like in addition to the print management device 10 and the printing device 20. The processing device, the post-processing device, and the device are connected to the communication line 2. The operation status and the processing capability are managed by the print management device 10, and processing is performed in accordance with an instruction from the print management device 10. In the present exemplary embodiment, description is focused on the management of the printing device 20 performed by the print management device 10 in particular, devices such as the processing device, the post-processing device, and the cutting device are not illustrated in the print management system 100 illustrated in FIG. 1.

For example, the processing device performs processing such as coating a varnish or the like on a print surface of a recording medium (hereinafter, referred to as a "sheet") such as paper printed by the printing device 20 so as to suppress scratch or adhesion of dirt. The post-processing device performs processing such as binding sheets of text in a folded state so as to be aligned in the page order, attaching a cover sheet, and making a booklet. The cutting device performs processing such as cutting a blank part of the bound booklet to make the booklet of a predetermined size.

Figure 2:
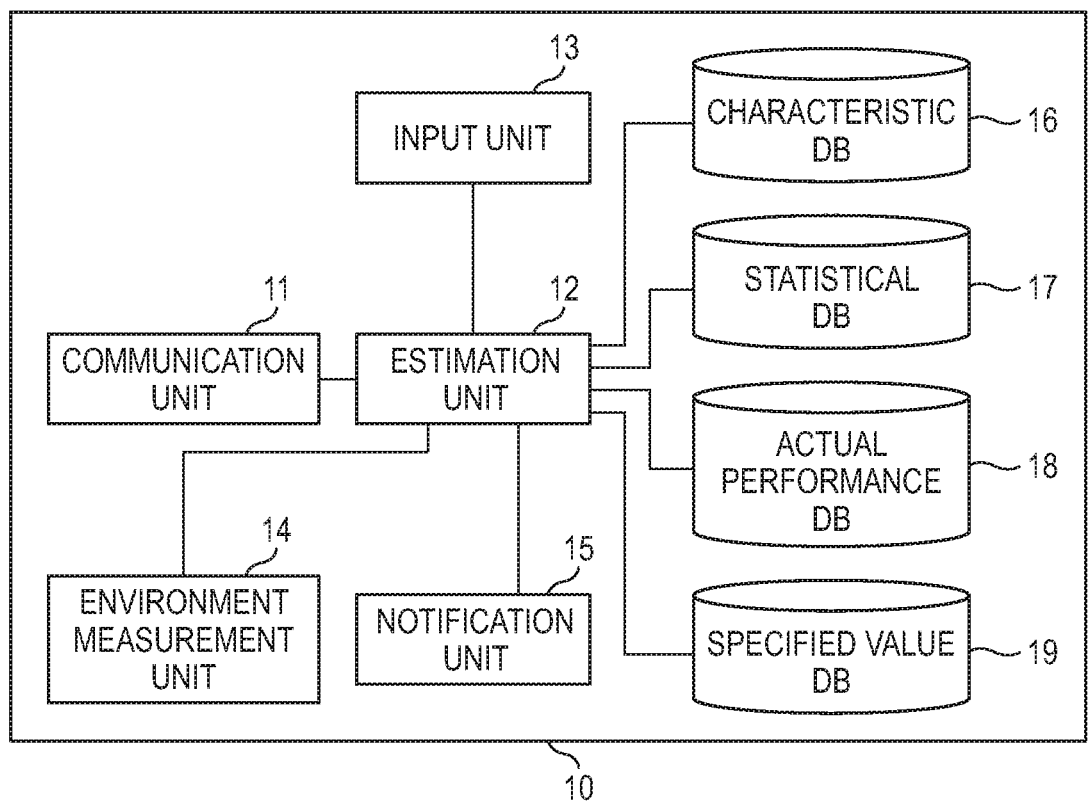
FIG. 2 is a functional block diagram illustrating an example of a function block of a print management device.

FIG. 2 is a functional block diagram illustrating an example of a function block of the print management device 10. The print management device 10 includes the respective function blocks of a communication unit 11, an estimation unit 12, an input unit 13, an environment measurement unit 14, and a notification unit 15, and the respective databases (DB) of a characteristic DB 16, a statistical DB 17, an actual performance DB 18, and a specified value DB 19.

The database may indicate an application that manages data in association with a pre-determined main key. However, the "database" according to the present exemplary embodiment does not mean to manage data by necessarily using various commercial or non-commercial data base applications and indicates a general mechanism for storing and managing data. Thus, a file system used to manage the data is also an example of a database. It is needless to say that the print management device 10 may use a database application to manage the data.

The communication unit 11 performs data communication with the printing device 20 and receives, for example, actual performance information according to a processing capability and occurrence of an abnormality that causes a delay in a period of a previously planned print process, from the printing device 20.

The "actual performance information according to the processing capability" indicates a print capability, based on an actual print result obtained by the printing device 20 on, for example, how many sheets the images are printed thereon during a certain period. Hereinafter, the time after the start of printing is called an "actual print time", and the total number of sheet surfaces actually printed during the actual print time is called an "actual sheet surface number". The actual print time and the actual sheet surface number are initialized to "0" every time the printing starts. Since the printing device 20 prints a front surface and a rear surface of one sheet, in a case where the number of sheets to be printed by the printing device 20 is represented, the number of printed sheet surfaces is represented rather than the number of printed sheets.

"An abnormality that causes a delay in a period of the previously planned print process" means, for example, an event occurring in the printing device 20 which is hard to predict the occurrence in advance in a planning stage of the print process, and a recoverable event.

In addition, the communication unit 11 transmits various instructions such as an operation instruction, a stop instruction, and a setting instruction to the designated printing device 20 in accordance with an instruction from the estimation unit 12 which will be described below.

Before printing a print material requested by a customer is started, the estimation unit 12 plans a print process of a print material so as to be in time for a delivery date designated by the customer, based on the sheet surface number (hereinafter, referred to as a "planned sheet surface number") of sheets to be printed so as to prepare the print material corresponding to the requested books and the specified print capability of the printing device 20.

A "specified print capability" refers to a processing capability relating to the printing previously specified for each model of the printing device 20 by a development maker or the like of the printing device 20 and is represented by the number of sheet surfaces to be printed for one minute. That is, the specified print capability refers to a processing capability relating to the printing of a specification described in a catalog or the like of the printing device 20. The specified print capability is not necessarily represented by the number of sheet surfaces printed for one minute but may be represented by the number of printable sheet surfaces per other time such as five minutes and may be represented by using the time required for printing one sheet surface. In the present exemplary embodiment, it is assumed that the print capability of the printing device 20 is represented by the number of sheet surfaces printed for one minute as an example.

Specifically, in a case where the printing device 20 having the specified print capability of printing 100 sheet surfaces per minute prints, for example, print materials having 1000 sheet surface to be printed, the estimation unit 12 estimates that a length of the print process is 10 minutes. As such, a print process estimated from the planned sheet surface number and the specified print capability is referred to as "planned print process 38".

However, even if printing the print material is started in accordance with the planned print process 38, the printing may not be completed at the end time of the planned print process 38 due to, for example, an individual difference between the printing devices 20, a type, a size, and a thickness of the sheet to be used, a difference between the specified print capability and the actual print capability of the printing device 20, and the like. Thus, the estimation unit 12 estimates a completion prediction time of the print process while monitoring the actual print capability of the printing device 20 during printing. A method of estimating the completion prediction time of a specific print process of the estimation unit 12 will be described in detail below. An actual print capability of the printing device 20 is also called the "actual print capability", and the actual print capability is obtained by dividing the actual sheet surface number by an actual print time.

The input unit 13 receives an instruction from an administrator of the print management system 100 via the input unit 32 connected to the print management device 10, for example, a keyboard or a mouse, and notifies the estimation unit 12 of the reception. The instruction notified from the input unit 13 includes instructions for managing the print process, such as a generation instruction of the planned print process 38, a selection instruction of the printing device 20 that performs print, and a print start instruction to the selected printing device 20.

The environment measurement unit 14 measures an operation environment of each printing device 20 and notifies the estimation unit 12 of the measurement result. The operation environment of the printing device 20 measured by the environment measurement unit 14 includes, for example, a temperature and a humidity of a space in which the printing device 20 is provided. Information, which quantitatively represents a status of the space in which the printing device 20 operates, such as the temperature and the humidity is referred to as "environment information".

The estimation unit 12 uses the environment information measured by the environment measurement unit 14 to estimate the completion prediction time of the print process which will be described in detail below.

The estimation unit 12 notifies the notification unit 15 of, for example, the planned print process 38 which is performed, a processing status (hereinafter, referred to as a "actual print process 36") of the print process based on the actual print capability, and management information of the print process such as the completion prediction time, which is estimated, of the print process.

If the management information of the print process is received from the estimation unit 12, the notification unit 15 displays the received management information in the display unit 33 and notifies the administrator of the management information. Here, an example in which the notification unit 15 notifies the administrator of the management information using the display unit 33 will be described as an example, and the notification unit 15 may notify on the management information by voice or by printing on the printer. Furthermore, the notification unit 15 may notify the communication unit 11 of the management information and may notify another device connected to the communication line 2 of the management information.

Figure 3:
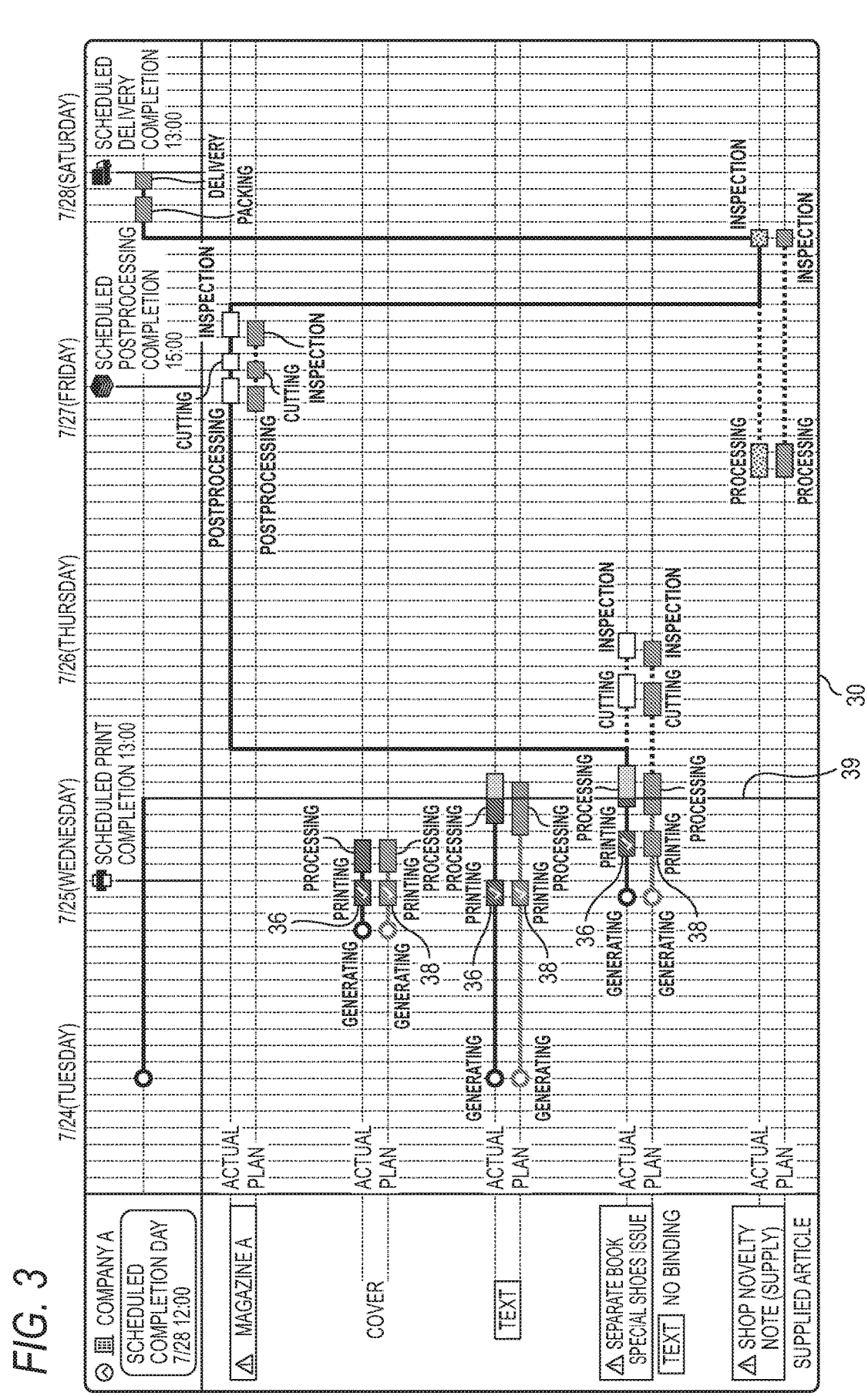
FIG. 3 is a diagram illustrating an example of a management screen in which an actual print process is compared with a planned print process.

FIG. 3 is a diagram illustrating an example of the management screen 30 displayed in the display unit 33. As illustrated in FIG. 3, the management screen 30 is a time chart in which the horizontal axis direction is along a time axis, and displays components in a state where the actual print process 36 is compared with the planned print process 38. One end of the time chart along the time axis denotes the start time of a process and the other end denotes the end time of the process. That is, in the management screen 30, a length of the time chart along the time axis represents a period in which each process is performed. A boundary line 39 indicates a current time and indicates the process performed at the current point of time.

Here, the "components" are configuration elements that configure the print material. For example, in a case where the print material is a magazine, the components include a cover, a text, a separate book ("special shoes issue" in the example illustrated in FIG. 3), and appendix ("novelty note" in the example illustrated in FIG. 3). At least one process of printing, processing, post-processing, cutting, and inspection is performed on the components according to the contents of the components as necessary, the respective components are combined together, and thereby, a magazine is made.

The management screen 30 displays a processing status of each process from the generation of data corresponding to each component to the delivery of the print material made by combining the components.

Figure 4:
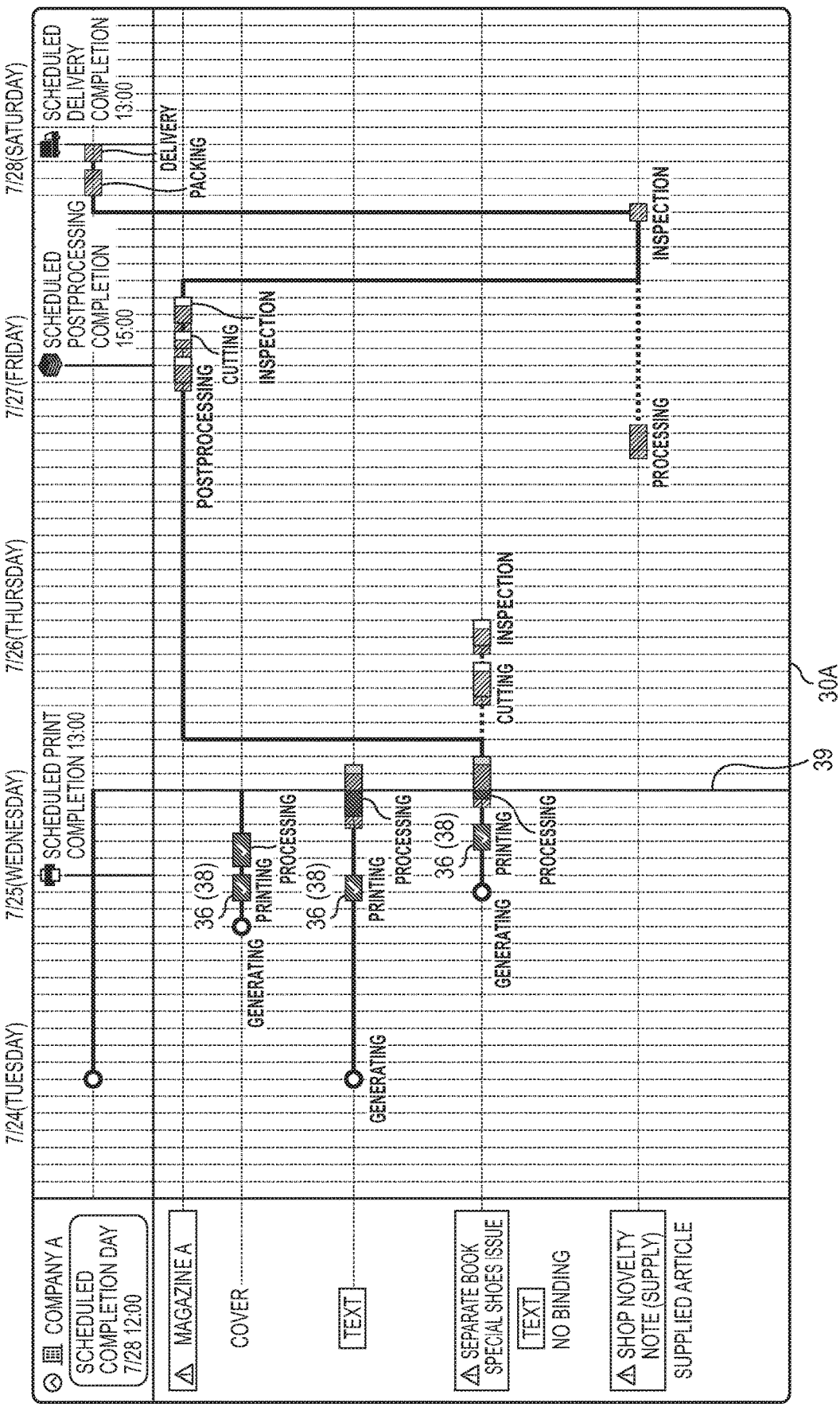
FIG. 4 is a diagram illustrating an example of a management screen in which the actual print process and the planned print process are integrated.

FIG. 4 is a diagram illustrating an example of a management screen 30A displayed by integrating the actual print process 36 and the planned print process 38 with respect to the management screen 30 of FIG. 3. As such, the notification unit 15 notifies on the actual print process 36 and the planned print process 38 in plural display formats in accordance with an instruction of an administrator.

The respective database of the characteristic DB 16, the statistical DB 17, the actual performance DB 18, and the specified value DB 19 are connected to the estimation unit 12, and during processing of the estimation unit 12, content of a table managed by the respective databases are referred to and updated.

FIG. 5 is a diagram illustrating an example of a printing device characteristic table 22 managed in the characteristic DB 16. The printing device characteristic table 22 manages characteristics of the specifications of each printing device 20 included in the print management system 100.

Specifically, as illustrated in FIG. 5, the printing device characteristic table 22 is a table in which, for example, a printing device ID, a sheet type, a specified print capability, a color type, a print method, and a group are associated with each other for each printing device 20.

Here, the sheet type represents the type of a recording medium used by the printing device 20, and for example, a "roll" which is an elongated sheet wound in a concentric circle is associated with "cut paper" which is a sheet cut in a predetermined size according to a size of the paper feeding tray. Depending on the model of the printing device 20, the printing device 20 which uses both the roll and the cut paper also exists.

The color type represents characteristics of a print color printed by the printing device 20, and is associated with a "color" representing correspondence to multicolor printing in which, for example, yellow, magenta, cyan, and black are used, or "black and white" representing correspondence to a greyscale. Depending on the model of the printing device 20, the printing device 20 corresponding to both the color and the black and white also exits.

The print method represents a print method which is adopted in the printing device 20, and for example, "inkjet" in which printing is performed by ejecting ink onto a sheet surface is associated with "toner" which printing is performed by forming an image by emitting a laser and attaching the toner to the formed image.

The group represents a result obtained by grouping the printing devices 20 included in the print management system 100 by focusing on the characteristics relating to printing. The characteristics relating to the printing are characteristics of specifications of a paper feeding method of the printing device 20 and the printing device 20 which influences at least one of print qualities. In the example of the printing device characteristic table 22 illustrated in FIG. 5, the sheet type, the color type, and the print method correspond to the characteristics relating to the printing. The printing device ID is identification information of the printing device 20, and the specified print capability is not included in the characteristics relating to the printing, because the specified print capability represents the number of sheet surfaces to be printed per unit time.

In the example of the printing device characteristic table 22 illustrated in FIG. 5, the printing device #1 and the printing device #2 are classified as "group A" because the sheet type, the color type, and the print method are the role, the color, and the inkjet, respectively and the print characteristics are the same. Due to the same reason, the printing device #3, the printing device #4, and the printing device #5 are classified as "group B", and the printing device #6, the printing device #7, the printing device #8, and the printing device #9 are classified as "group C".

That is, the group is a set the printing devices 20 having a relationship in which a print material that cannot be distinguished from the print material printed by the printing device 20 before a failure and moreover, the sheet used in the printing device 20 before the failure can be used as it is, for example, in a case where any of the printing devices 20 fails, even if the printing device 20 included in the same group as the failed printing device 20 is used as a substitute device.

Information included in the printing device characteristic table 22 is not limited to the information illustrated in FIG. 5, and may include operation information indicating, for example, whether or not the corresponding printing device 20 is in print, that is, whether or not the printing device 20 is in operation.

FIG. 6 is a diagram illustrating an example of a statistical table 24 managed by the statistical DB 17. The statistical table 24 is a table in which the statistical print capability is associated with, for example, each combination of the sheet type and the sheet size. The "statistical print capability" is a statistical value of the actual print capability of the printing device 20 so far, which is obtained by dividing a cumulative value of the actual sheet surface number recorded each time printing is performed by the printing device 20 by a cumulative value of the actual print time. Y11 to Y45 in FIG. 6 are the statistical print capability corresponding to each combination of the sheet type and the sheet size, and the statistical table 24 is generated for each environment information and for each printing device 20, and is managed by the statistical DB 17 as will be described below.

According to the statistical table 24 illustrated in FIG. 6, in a case where the sheet type is recycled paper and the sheet size is A4, Y33 is selected as the statistical print capability.

The statistical table 24 may be generated for each combination of the sheet type, the sheet size, and a sheet thickness.

The actual performance DB 18 stores the actual print time and the actual sheet surface number of each printing device 20 included in the print management system 100. That is, the actual print capability and the statistical print capability for each printing device 20 are obtained from the actual print time and the actual sheet surface number managed by the actual performance DB 18.

FIG. 7 is a diagram illustrating an example of an environment condition table 26 managed by the specified value DB 19. The environment condition table 26 is a table in which the statistical table 24 to be referred to is associated with each combination of a temperature and a humidity in a space in which the printing device 20 operates.

In a case where a relationship of Tmp1<Tmp2<Tmp3<Tmp4 for a temperature T is satisfied, for example, a category 1 of the temperature T represents a range of Tmp1≤T<Tmp2, a category 2 of the temperature T represents a range of Tmp2≤T<Tmp3, a category 3 of the temperature T represents a range of Tmp3≤T<Tmp4, and a category 4 of the temperature T represents a range of Tmp4≤T. In addition, in a case where a relationship of Hum1<Hum2<Hum3<Hum4 for a humidity H is satisfied, for example, a category 1 of the humidity H represents a range of Hum1≤H<Hum2, a category 2 of the humidity H represents a range of Hum2≤H<Hum3, a category 1 of the humidity H represents a range of Hum3≤H<Hum4, and a category 4 of the humidity H represents a range of Hum4≤H.

According to an environment condition table 26 illustrated in FIG. 7, in a case where the temperature T is included in the category 2 and the humidity H is included in the category 3, the statistical table 24 corresponding to a condition 10 is selected. As described above, since the statistical table 24 exists for each environment information and for each printing device 20, the statistical table 24 to be targeted is selected by a combination of the printing device ID of the printing device 20 and a condition X (X is an integer) obtained from the environment condition table 26.

Furthermore, the specified value DB 19 stores a specification recovery time table 28 for specifying the recovery time required for recovering an abnormality.

FIG. 8 is a diagram illustrating an example of the specification recovery time table 28. Recovery time (for example, unit is "time") for each abnormal type is specified in the recovery time table 28. According to an example of the specification recovery time table 28 illustrated in FIG. 8, in a case where "paper jam" that a sheet is jammed in a sheet transport path abnormality occurs, it is known that one hour is required to recover the paper jam. The specification recovery time table 28 exists for each printing device 20.

The recovery time for each abnormal type in the specification recovery time table 28 is not the time set based on the time taken for the actual recovery work, but the recovery time is an approximate value set based on a structure of the printing device 20 and the experience of a worker.

Detailed description will be made below, but in a case where an abnormality occurs in the printing device 20, the print management device 10 acquires the recovery time corresponding to an abnormality type received from the printing device 20 from the specification recovery time table 28 by using the communication unit 11, and estimates the completion prediction time of the print process.

Figure 9:
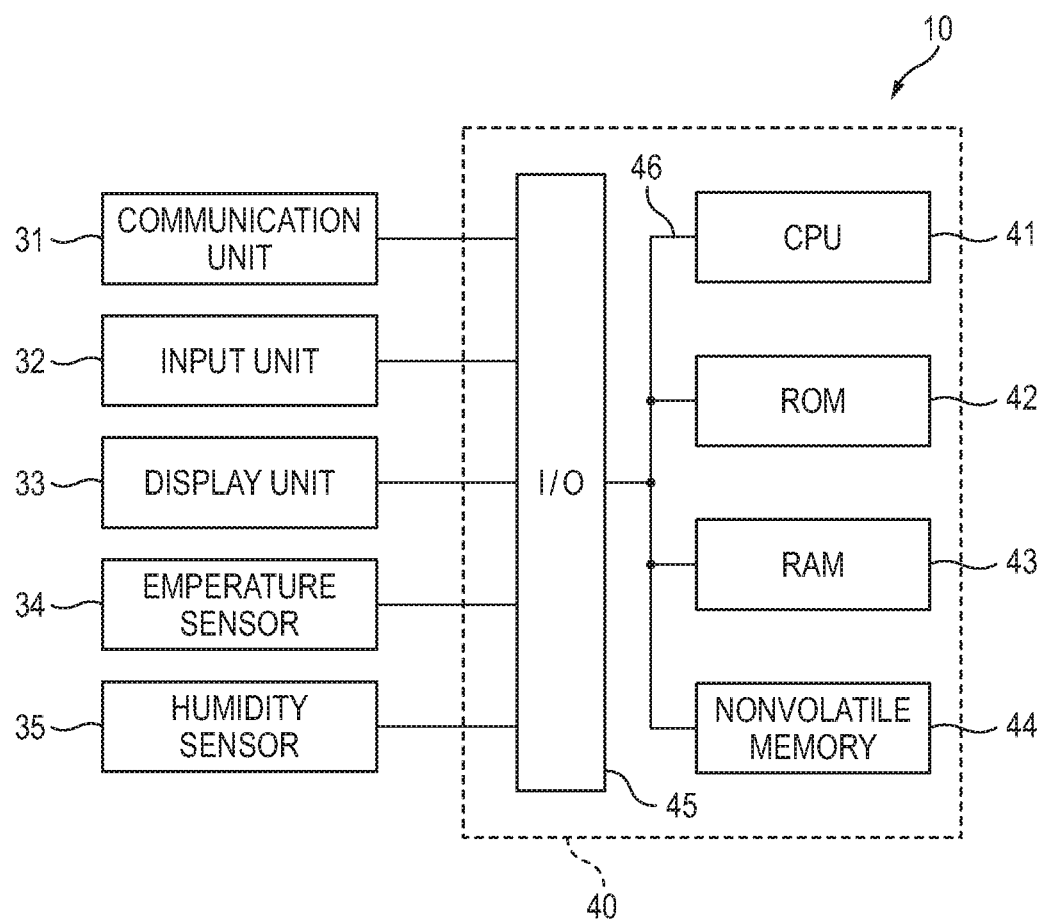
FIG. 9 is a diagram illustrating a configuration example of a main part of an electrical system in a print management device.

The print management device 10 illustrated in FIG. 2 is configured by using, for example, a computer 40. FIG. 9 is a diagram illustrating an example of a configuration example of a main part of an electrical system of the print management device 10.

The computer 40 includes a central processing unit (CPU) 41 that is responsible for each functional unit of the print management device 10 according to the present exemplary embodiment illustrated in FIG. 2, a read only memory (ROM) 42 for storing a print management program, a random access memory (RAM) 43 used as a temporary work area of the CPU 41, a nonvolatile memory 44, and an input and output interface (I/O) 45. The CPU 41, the ROM 42, the RAM 43, the nonvolatile memory 44, and the I/O 45 are connected to each other via a bus 46.

The nonvolatile memory 44 is an example of a storage device in which stored information is maintained even if power supplied to the nonvolatile memory 44 is shut off, and for example, a semiconductor memory may be used, or a hard disk may be used. The respective databases, such as the characteristic DB 16, the statistical DB 17, the actual performance DB 18, and the specified value DB 19 are mounted in the nonvolatile memory 44.

Meanwhile, for example, a communication unit 31, an input unit 32, a display unit 33, a temperature sensor 34, and a humidity sensor 35 are connected to the I/O 45.

The communication unit 31 is connected to the communication line 2 and has a communication protocol for communicating data with another device such as the printing device 20 connected to the communication line 2.

The input unit 32 is an input device that receives an instruction from an administrator of the print management system 100 and notifies the CPU 41 of the instruction, and, for example, a button, a keyboard, a mouse, a touch panel, and the like are used for the input device.

The display unit 33 is a display device for displaying information processed by the CPU 41 as an image, and, for example, a liquid crystal display or an organic electro luminescence (EL) display, and the like are used for the display device.

The temperature sensor 34 measures a temperature of a space in which the respective printing devices 20 included in the print management system 100 operate.

The humidity sensor 35 measures a humidity of the space in which the respective printing devices 20 included in the print management system 100 operate.

Units connected to the I/O 45 are not limited to the communication unit 31, the input unit 32, the display unit 33, the temperature sensor 34, and the humidity sensor 35. For example, a printer or the like that prints management information of the print process managed by the print management device 10 on a recording medium may be connected to the I/O 45. In addition, the temperature sensor 34 and the humidity sensor 35 are not necessarily required to be connected to the I/O 45, and the CPU 41 may acquire the temperature and humidity measured by the respective printing devices 20 from the printing devices 20 via the communication unit 31.

Next, an operation of the print management device 10 according to the present exemplary embodiment will be described with reference to FIG. 10.

Figure 10:
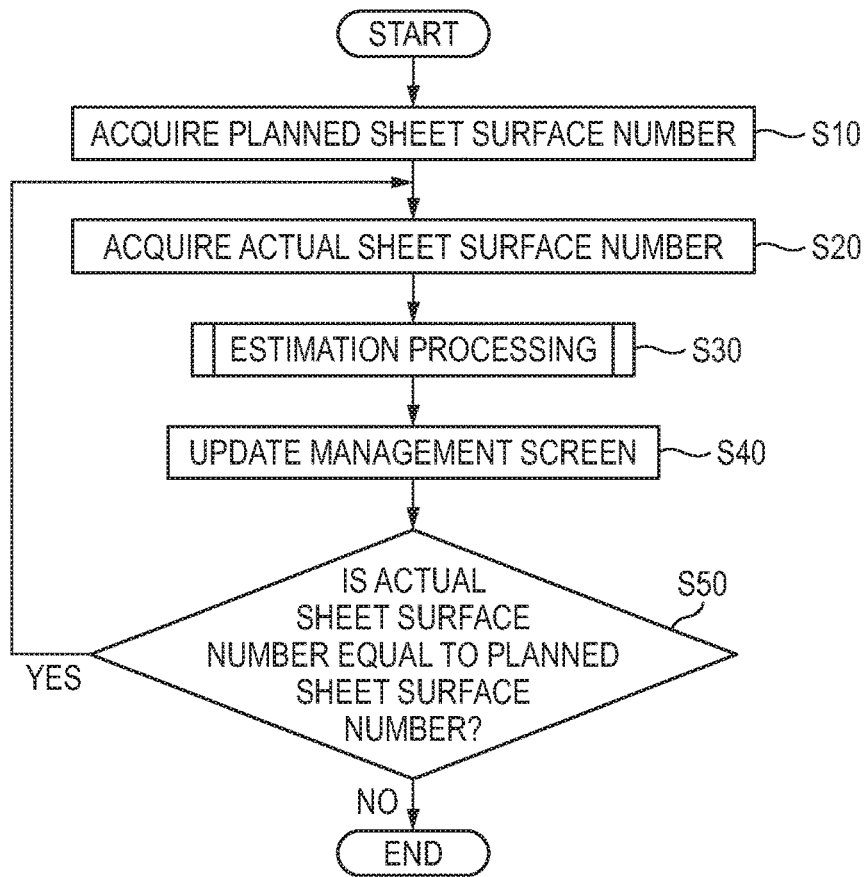
FIG. 10 is a flowchart illustrating an example of flow of print management processing.

FIG. 10 is a flowchart illustrating an example of a flow of print management processing performed by the CPU 41 in a case where the printing device 20 starts printing in accordance with the planned print process 38.

A print management program that specifies print management processing is previously stored in the ROM 42 of the print management device 10. The CPU 41 of the print management device 10 reads the print management program stored in the ROM 42 and performs the print management processing.

For the sake of convenient description, an example in which one printing device 20 starts printing in accordance with the planned print process 38 will be described herein, and in a case where plural printing devices 20 start printing, the respective printing device 20 perform the following print management processing.

First, in step S10, the CPU 41 acquires the planned sheet surface number in the planned print process 38 from the nonvolatile memory 44.

In step S20, the CPU 41 acquires the actual sheet surface number from the printing device 20 via the communication unit 31 and stores the actual sheet surface number in the RAM 43.

In step S30, the CPU 41 performs estimation processing of estimating a completion prediction time of the print process. Thereby, the completion prediction time of the print process in the printing device 20 is obtained.

Specifically, the CPU 41 estimates the completion prediction time of the print process using Equation (1).

$$P=(\beta 1-\beta 2)/\alpha 1 \qquad \text{Equation (1)}$$

Here, P represents the completion prediction time of the print process, $\beta 1$ represents the planned sheet surface number acquired in step S10, $\beta 2$ represents the actual sheet surface number acquired in step S20, and $\alpha 1$ represents the specified print capability. The specified print capability used for estimating the completion prediction time of the print process is obtained by acquiring the specified print capability associated with the printing device ID included in the printing device 20 from the printing device characteristic table 22.

In step S40, the CPU 41 updates a length of the time chart indicating a period of the actual print process 36 on the management screen 30 illustrated in FIG. 3, based on the completion prediction time estimated in step S30. Specifically, the CPU 41 adds the completion prediction time to the current time to estimate the end time of the actual print process 36 and updates the length of the time chart indicating the period of the actual print process 36.

In this case, the CPU 41 may display the completion prediction time estimated in step S30 as a numerical value on the management screen 30. Since a deviation between the actual print process 36 and the planned print process 38 is recognized by comparing the time charts of the actual print process 36 and the planned print process 38, even in a case where the time chart of the actual print process 36 is updated, the CPU 41 does not update the time chart of the planned print process 38 which is initially set.

In step S50, the CPU 41 compares the planned sheet surfaces number obtained in step S10 with the actual sheet surface number acquired in step S20 and determines whether or not the actual sheet surface number reaches the planned sheet surface number, that is, whether or not the print process is ended. In a case where the actual sheet surface number does not reach the planned sheet surface number, the process proceeds to step S20 because the print process is not ended yet, and the latest actual sheet surface number is acquired from the printing device 20. By repeatedly performing the processing of steps S20 to S50, the completion prediction time of the print process is estimated in real time until the print process is completed, and the management screen 30 is updated by using the completion prediction time, which is estimated, of the print process.

Meanwhile, in a case where the actual sheet surface number reaches the planned sheet surface number, the print management process of FIG. 10 is ended because the print process is completed.

In step S30, the completion prediction time of the print process is estimated by using the specified print capability, and the method of estimating the completion prediction time of the print process is not limited to this.

For example, the CPU 41 may estimate the completion prediction time of the print process by using Equation (2).

$$P=(\beta1-\beta2)\gamma1/\beta2=(\beta1-\beta2)\alpha2 \qquad \text{Equation (2)}$$

Here, γ1 is the actual print time of the printing device 20 required to print the sheets by β2, and α2 is the actual print capability. For example, the actual print time may be acquired from the printing device 20 together with the actual sheet surface number in step S20.

In a case where the completion prediction time of the print process is estimated by using Equation (2), the completion prediction time of the print process is estimated from the actual print capability of the printing device 20. Thus, the completion prediction time is estimated with a high accuracy, compared with a case where the completion prediction time of the print process is estimated by using Equation (1) which estimates the completion prediction time of the print process is estimated by using the specified print capability.

Furthermore, in the estimation processing of step S30, the completion prediction time of the print process may be estimated by using the statistical print capability.

Figure 11:
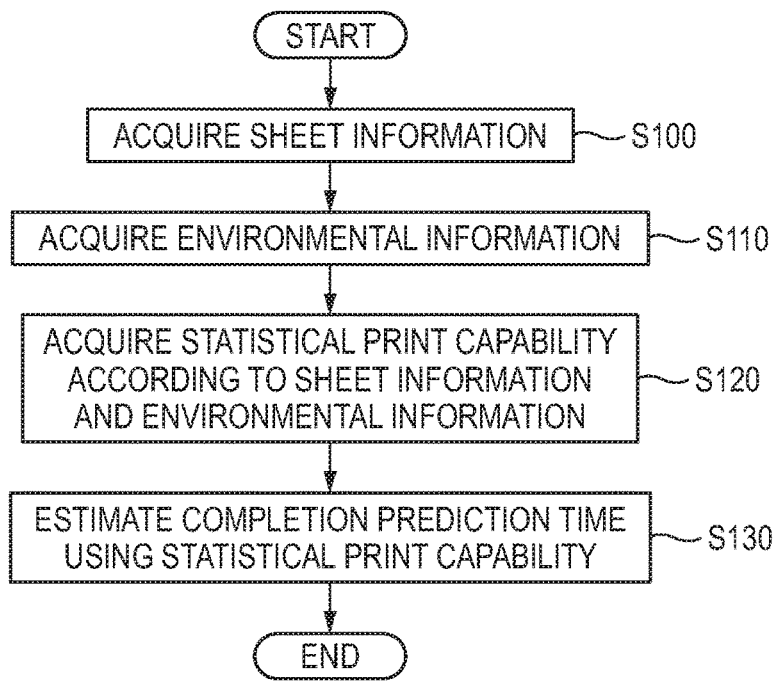
FIG. 11 is a flowchart illustrating an example of a flow of estimation processing.

FIG. 11 is a flowchart illustrating an example of a flow of the estimation processing of estimating the completion prediction time of the print process by using the statistical print capability in step S30.

In step S100, the CPU 41 acquires sheet information of a sheet used in printing from the printing device 20 via the communication unit 31.

The "sheet information" is an attribute relating to the sheet that is used to acquire the statistical print capability from the statistical table 24 illustrated in FIG. 6, and includes, for example, a type of the sheet and a sheet size. In a case where the statistical table 24 is generated for a combination of each of the type of the sheet, the size of the sheet, and a thickness of the sheet, the type of the sheet, the size of the sheet, and a thickness of the sheet are acquired as the sheet information.

In step S110, the CPU 41 acquires environment information of a space in which the printing device 20 operates.

In step S120, the CPU 41 acquires a condition X which is identification information indicating a combination of the temperature and the humidity included in the environmental information from the environment condition table 26 by using the environmental information acquired in step S110. Then, the CPU 41 acquires the statistical table 24 corresponding to a combination of the acquired condition X and a printing device ID of the printing device 20 which is in print, from the statistical DB 17.

The CPU 41 acquires the statistical print capability corresponding to a combination of the sheet type and the sheet size included in the sheet information acquired in step S100 with reference to the acquired statistical table 24.

In step S130, the CPU 41 estimates the completion prediction time of the print process by using the statistical print capability acquired in step S120.

Specifically, the CPU 41 estimates the completion prediction time of the print process by using Equation (3).

$$P=(\beta1-\beta2)\gamma2/\beta3=(\beta1-\beta2)\alpha3 \qquad \text{Equation (3)}$$

Here, γ2 represents a cumulative value of the actual sheet surface numbers printed by the printing device 20 under the acquired environmental information and the acquired sheet information, β3 represents a cumulative value of the actual print times printed by the printing device 20 under the acquired environmental information and the obtained sheet information, and α3 represents the statistical print capability. Thereby, the estimation processing illustrated in FIG. 11 is ended.

In a case where the completion prediction time of the print process is estimated by using the Equation (3), the completion prediction time of the print process is estimated from the statistical print capability for each printing device 20 in consideration of the environmental information of a space in which the printing device 20 operates and the sheet information on a sheet used for printing. Thus, the completion prediction time is estimated with a high accuracy, compared with a case where the completion prediction time of the print process is estimated by using Equation (1) and Equation (2) without considering the environmental information and the sheet information.

Modification Example 1 of First Exemplary Embodiment

In the exemplary embodiment described above, estimation of the completion prediction time of the print process in the case where an unexpected abnormality occurs in the period of the planned print process 38 is described. In the present modification example, estimation of the completion prediction time of the print process in a case where an abnormality occurs in the printing device 20 will be described.

Figure 12:
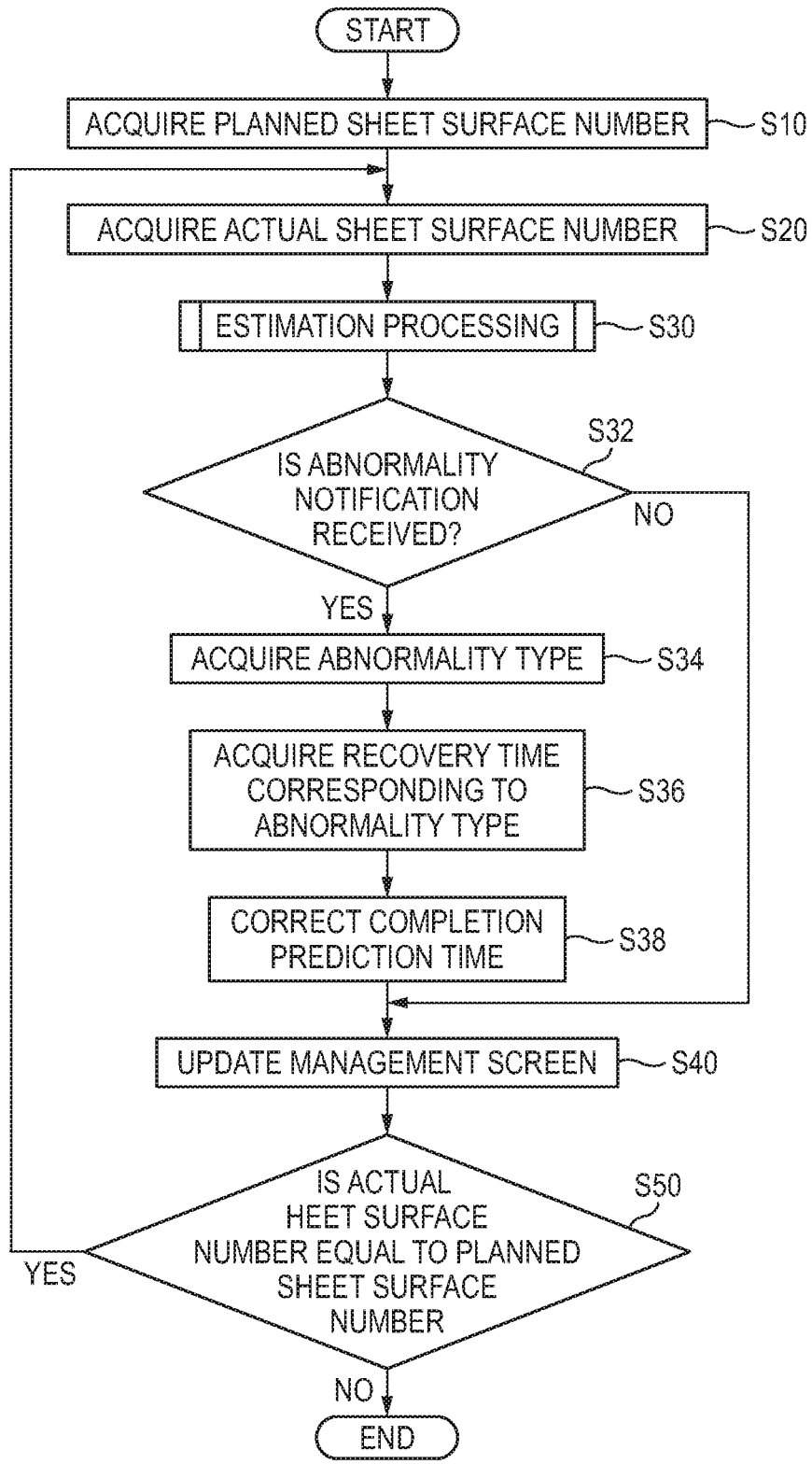
FIG. 12 is a flowchart illustrating an example of a flow in a modification example of the print management processing.

FIG. 12 is a flowchart illustrating an example of a flow of the print management processing performed by the CPU 41 in a case where the printing device 20 starts printing in accordance with the planned print process 38.

A difference between the flowchart of the print management processing illustrated in FIG. 12 and the flowchart illustrated in FIG. 10 is that steps S32 to S38 are added to the flowchart of the print management processing, and the other processes are the same as in the flowchart illustrated in FIG. 10.

Step S32 is performed after the estimation processing which uses any one of Equation (1) to Equation (3) is performed in step S30.

In step S32, the CPU 41 determines whether or not an abnormality notification indicating that an abnormality occurs in the printing device 20 is received from the printing device 20. In a case where the abnormality notification is received from the printing device 20, the CPU 41 proceeds to step S34. The CPU 41 determines that the abnormality notification is received from the printing device 20 until the abnormality notified by the abnormality notification is recovered.

In step S34, the CPU 41 acquires an abnormal type generated by the printing device 20. The abnormal type generated by the printing device 20 is included in the abnormality notification acquired from the printing device 20.

In step S36, the CPU 41 estimates a recovery time taken until the abnormality occurred in the printing device 20 is recovered. After receiving the abnormality notification, in step S36 which is initially performed, the CPU 41 acquires the recovery time corresponding to the acquired abnormality type with reference to the specification recovery time table 28 managed by the specified value DB 19. Meanwhile, in the step S36 performed after the second time, A time obtained by subtracting the elapsed time from when the abnormality notification is received from the recovery time acquired in the first step S36 is set as the recovery time. Thus, until the abnormality notified by the abnormality notification is recovered, the recovery time initially estimated in accordance with the elapsed time from when the abnormality notification is notified is shortened, and thereby, progress of the recovery work made by a worker is reflected in the recovery time.

In a case where the abnormality is recovered, the number of times of performance in step S36 is initialized to 0. In addition, the number of times of performance in step S36 and the recovery time estimated in step S36 are managed for each abnormality type. Thus, in a case where plural errors occur, the CPU 41 sets a time obtained by adding the recovery time estimated n each abnormality as the recovery time. In addition, the CPU 41 processes the recovery time on a minute-to-minute basis. In a case where the specification recovery time table 28 is generated on a time basis, the CPU 41 converts the time unit into a minute unit.

In step S38, the CPU 41 sets the completion prediction time in consideration of the recovery time for coping with the occurred abnormality by adding the recovery time acquired in step S36 to the completion prediction time of the print process estimated in step S30. That is, the CPU 41 estimate the completion prediction time of the print process by using Equation (4).

$$P=(\beta 1-\beta 2)\alpha 3+\delta \quad \text{Equation (4)}$$

Here, δ represents the recovery time acquired in step S36.

Meanwhile, in a case where it is determined that the abnormality notification is not received from the printing device 20 in the determination processing of step S32, the processing proceeds to step S40 without performing the processing of step S34 to step S38.

That is, in the print management processing illustrated in FIG. 12, even in a case where an abnormality occurs in the printing device 20, the completion prediction times of the print process including the recovery time of the abnormality is sequentially estimated.

Here, the recovery time to deal with the abnormality is estimated by using the specification recovery time table 28 as an example, and a method of estimating the recovery time is not limited to this. For example, the recovery time may be estimated by using a statistical value (hereinafter, referred to as "statistical recovery time") relating to the time required to deal with the abnormality collected until the abnormality occurs.

The statistical recovery time is recorded in a statistical recovery time table 28A having the same format as the specification recovery time table 28 illustrated in FIG. 8. A statistical value such as an average value of the recovery times so far which are actually required until a worker deals with the abnormality to recover with respect to the respective printing devices 20 included in the print management system 100 is set in the recovery time for each abnormality type in the statistical recovery time table 28A. The CPU 41 starts measuring the recovery time each time the abnormality notification is received from the printing device 20 and records the time until the recovery notification for notifying that the abnormality is recovered from the printing device 20 is received for each abnormality type. The CPU 41 continuously updates the statistical recovery time by using the recovery time for each abnormality type recorded in this manner.

In a case where the statistical recovery time table 28A is generated, in addition to, for example, the printing device 20 in which an abnormality occurs, the CPU 41 may create the statistical recovery time table 28A by also using a statistical value of the recovery time required for coping with the abnormality in the other printing devices 20 not included in the print management system 100.

In addition, the statistical recovery time table 28A may be generated for each model of the printing devices 20 and may be managed by the statistical DB 17. In this case, the statistical recovery time table 28A corresponding to the model of the printing device 20 in which the abnormality occurs is acquired by the CPU 41 by making a model name of the printing device 20 associate with the printing device characteristic table 22 illustrated in FIG. 5 in advance and acquiring the model name of the printing device 20 from a printing device ID of the printing device 20. If the models are different from each other, a structure of the printing device 20 may also change, and the recovery time of the printing device 20 may also change. Thus, by creating the statistical recovery time table 28A for each model of the printing device 20, the completion prediction time is estimated with a high accuracy, compared with a case where the recovery time is estimated by using the same statistical recovery time table 28A even for the printing devices 20 of different models.

In addition, in a case where the statistical recovery time table 28A is generated for each model of the printing device 20, in addition to, for example, the printing device 20 in which an abnormality occurs, the CPU 41 may create the statistical recovery time table 28A by using a statistical value of the recovery time required to deal with the abnormality in another printing device 20, which is not included in the print management system 100, of the same model as the printing device 20 in which the abnormality occurs.

Furthermore, the recovery time for the abnormality also changes depending on a proficiency degree of a worker to deal with. Thus, the CPU 41 may create the statistical recovery time table 28A for each worker by acquiring a worker ID identifying the worker coping with the abnormality from the printing device 20 and recording the recovery time for each abnormality type for each worker represented by the worker ID. For example, a worker ID of the worker in charge in coping with occurrence of the abnormality is set for each of the printing devices 20 in advance and the worker ID is notified to the print management device 10 together with the abnormality notification.

The method of notifying the worker ID is not limited to this, and for example, before the worker starts the recovery work, a worker ID of the worker is input to the printing device 20 in which the abnormality occurs, and the printing device 20 may notify the print management device 10 of the input worker ID. In this case, the CPU 41 estimates the recovery time using information common to the workers, for example, as in the specification recovery time table 28 until the worker ID is notified, and in a case where the worker ID is notified from the printing device 20, the CPU 41 may estimate the recovery time using the statistical recovery time table 28A generated for each worker.

In addition, the CPU 41 may create the statistical recovery time table 28A for each worker by using a statistical value of the recovery time required for a worker to deal with the abnormality in another printing device 20 not included in the print management system 100.

Furthermore, the CPU 41 may create the statistical recovery time table 28A associated with each worker for each model of the printing device 20. In this case, the CPU 41 may create the statistical recovery time table 28A by using a statistical value of the recovery time required for a worker to deal with the abnormality in another printing device 20, which is not include in the print management system 100, of the same model as the printing device 20 in which the abnormality occurs.

It is needless to say that the CPU 41 may create the statistical recovery time table 28A for each printing device 20 included in the print management system 100, and for each worker, not for each model of the printing device 20.

In a case where the printing device 20 in which an abnormality occurs is the printing device 20 that a worker initially deals with, there is no statistical value of the recovery time, and in this case, the CPU 41 may estimate the recovery time with reference to the specification recovery time table 28.

In the above description, estimation of the recovery time in a case where one worker deals with the abnormality is described, but plural workers may deal with the abnormality depending on situations. In a case where plural works deal with the abnormality, there is a tendency that the recovery time becomes faster as compared with a case where one person deals with the abnormality due to a reason that, for example, works are done in parallel and the like.

Thus, the CPU 41 may acquires the recovery time (hereinafter, referred to as "reference recovery time") of the worker which is the shortest recovery time with respect to the occurred abnormality type with reference to the statistical recovery time table 28A corresponding to, for example, each of plural workers, and may estimate the recovery time by multiplying the acquired reference recovery time by a preset people number factor according to the number of workers.

The people number factor is less than 1 and is set such that the more the number of workers, the smaller the people number factor. For example, the people number factor is set to "0.8" in a case where the number of workers is 2, and the people number factor is set to "0.7" in a case where the number of workers is 3.

In addition, separately from the statistical recovery time table 28A for each worker, the CPU 41 may create the statistical recovery time table 28A for each group of plural workers and may estimate the recovery time with reference to the statistical recovery time table 28A associated with the group of plural workers who deal with an abnormality.

Modification Example 2 of First Embodiment

For example, in a case where an abnormality occurs in the printing device 20 and it is estimated that end time of the print process calculated from the estimated completion prediction time of the print process is delayed more than end time of the planned print process 38, some countermeasures may be taken to remove the delay. As one of the countermeasures, it is conceivable to remove the delay by adding at least one printing device 20 (hereinafter, referred to as a "preliminary printing device 20B") that is not previously assigned to a print process in which a delay occurs initially and that is in an unavailable state, to the printing device 20 different from the printing device 20 (hereinafter, referred to as an "operational printing device 20A") that is previously assigned to the print process and is in printing, during the print process, and by performing printing using the preliminary printing device 20B.

In the present modification example, estimating the completion prediction time of the print process will be described in a case where the delay in the print process is removed by adding the preliminary printing device 20B in the middle of the print process. The operational printing device 20A is an example of the first printing device according to the present exemplary embodiment, and the preliminary printing device 20B is an example of the second printing device according to the present exemplary embodiment.

Figure 13:
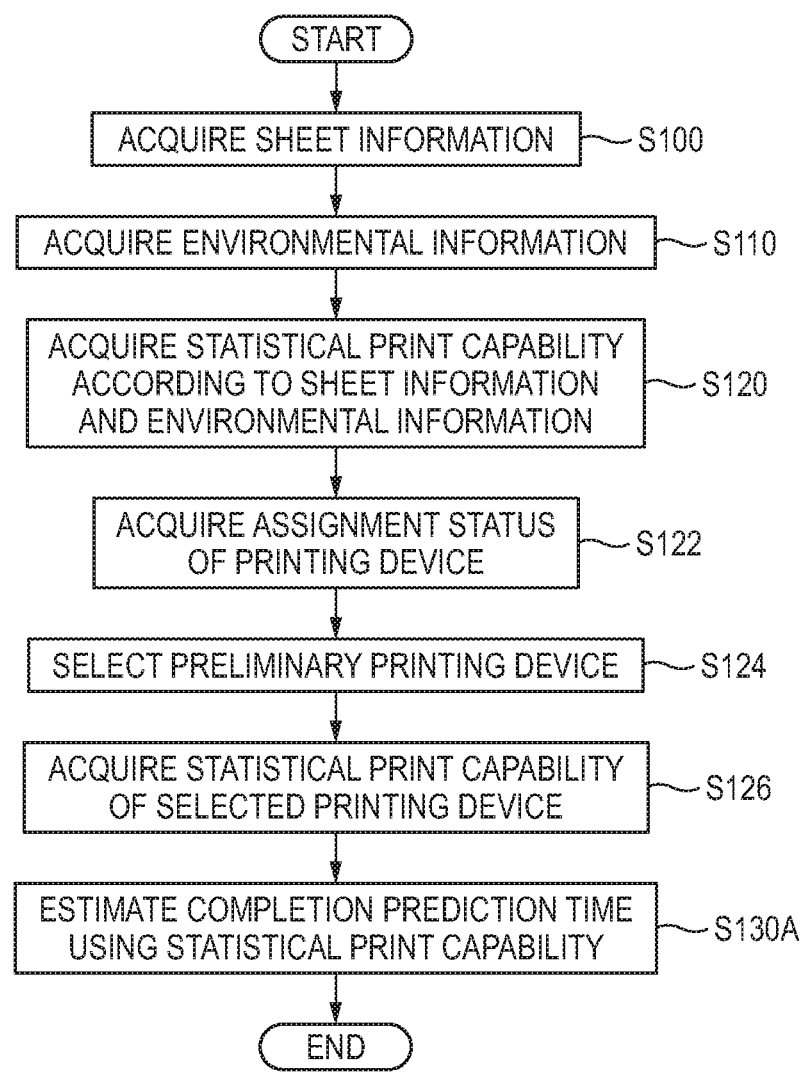
FIG. 13 is a flowchart illustrating an example of flow in a modification example of estimation processing.

FIG. 13 is a flowchart illustrating an example of a flow of the estimation processing performed by the CPU 41 in step S30 of FIG. 10 and FIG. 12, for example, in a case where an addition instruction of the preliminary printing device 20B is received from an administrator of the print management system 100.

A difference between the flowchart of the estimation processing illustrated in FIG. 13 and the flowchart illustrated in FIG. 11 is that step S122 to step S126 are added to the flowchart of the estimation processing and step S130 is replaced with step S130A. The other processes are the same as in the flowchart illustrated in FIG. 11.

The CPU 41 acquires a statistical print capability of the operational printing device 20A according to the sheet information and the environmental information in steps S100 to S120, and the processing proceeds to step S122. The CPU 41 may acquire the actual print capability of the operational printing device 20A instead of the statistical print capability of the operational printing device 20A. The actual print capability of the operational printing device 20A is an example of the actual performance information in the present exemplary embodiment.

In step S122, the CPU 41 acquires an assignment status in the planned print process 38 planned after the current time for each printing device 20 included in the print management system 100.

In step S124, the CPU 41 selects the printing device 20 which is not assigned to any planned print process 38 as a candidate for the preliminary printing device 20B by using an assignment status of the printing device 20 acquired in step S122 during a period from the current time of the print process to which the operational printing device 20A is assigned to the completion prediction time of the print process. That is, the CPU 41 selects the printing device 20 in an unavailable state as a candidate for the preliminary printing device 20B until the print process is ended.

Among the candidates for the preliminary printing device 20B selected in this way, the printing devices 20 having characteristics different from the operational printing device 20A may exist. Since there is a case where print materials are different in quality if characteristics relating to printing are different from each other, it is preferable that the preliminary printing device 20B has the same characteristics relating to the printing as characteristics of the operational printing device 20A. Thus, the CPU 41 selects the printing device 20 having the same characteristics relating to the printing as the printing device 20A as the preliminary printing device 20B from the candidates for the preliminary printing device 20B. Specifically, the CPU 41 selects the printing device 20 included in the same group as the operational printing device 20A as the preliminary printing device 20B among the candidates for the preliminary printing device 20B with reference to the printing device characteristic table 22. There is no limit on the number of the preliminary printing devices 20B to be selected and plural preliminary printing devices 20B may be selected.

In step S126, the CPU 41 uses the sheet information acquired in step S100 and the environmental information acquired in step S110 to acquire the statistical print capability of the preliminary printing device 20B from the statistical table 24 associated with the preliminary printing device 20B selected in step S124, in the same manner as in processing of step S120. The statistical print capability of the preliminary printing device 20B acquired in step S126 is an example of the statistical information in the present embodiment.

In step S130A, the CPU 41 estimates the completion prediction time of the print process in a case where printing is performed together with the operational printing device 20A by adding the preliminary printing device 20B. Specifically, the CPU 41 estimates the completion prediction time of the print process by using Equation (5).

Equation 5

$$P=(\beta 1-\beta 2)/(\alpha 3+\alpha 4) \tag{5}$$

Here, $\alpha 3$ represents the statistical print capability of the operational printing device 20A, and $\alpha 4$ represents the statistical print capability of the preliminary printing device 20B. Instead of $\alpha 3$, $\alpha 2$ indicating the actual print capability of the operational printing device 20A may be used.

The CPU 41 may estimate the completion prediction time of the print process by using the specified print capability of the preliminary printing device 20B instead of the statistical print capability of the preliminary printing device 20B. As described above, the estimation processing illustrated in FIG. 13 is ended.

In a case where the estimation process illustrated in FIG. 13 is performed in step S30 in the print management process of FIG. 12 corresponding to occurrence of an abnormality, estimating the completion prediction time of the print process in step S38 of FIG. 12 is made by Equation (6).

Equation 6

$$P=(\beta 1-\beta 2)/(\alpha 3+\alpha 4)+\delta \tag{6}$$

In the above example, the print management device 10 selects the preliminary printing device 20B, but an administrator of the print management system 100 may select the preliminary printing device 20B.

Thus, the CPU 41 controls the display unit 33 to display the candidate for the preliminary printing device 20B, which is selected in step S124 of FIG. 13, in the unavailable state for the completion prediction time of the print process, in the display unit 33.

In this case, the CPU 41 sets the printing device 20 selected by the administrator among the preliminary printing devices 20B displayed in the display unit 33 and estimates the completion prediction time of the print process by using Equation (5) and Equation (6).

In a case where the preliminary printing device 20B is selected by the administrator, the CPU 41 determines whether or not there is the printing device 20 having the higher statistical print capability than the preliminary printing device 20B selected by the administrator with reference to the statistical table 24 for each candidate for the preliminary printing device 20B displayed in the display unit 33. In a case where there is the printing device 20 having the higher statistical print capability than the preliminary printing device 20B selected by the administrator, the CPU 41 notifies the administrator that there is the preliminary printing device 20B in which reduction of the completion prediction time of the print process is expected more than the preliminary printing device 20B selected by the administrator, and notifies the administrator of the preliminary printing device 20B in which the reduction of the completion prediction time of the print process is expected. That is, the print management device 10 gives an advice regarding selection of the preliminary printing device 20B to the administrator who is unfamiliar with selection of the preliminary printing device 20B.

Here, although an example is described in which the preliminary printing device 20B is added to remove the delay in the print process, in a case where the actual print process 36 is expected to end earlier than the planned print process 38, the CPU 41 may select the operational printing device 20A such that the end time of the actual print process 36 is not delayed more than the end time of the planned print process 38 even when the operation is stopped, and may stop the operation of the selected operational printing device 20A. There is a case where the operational printing device 20A that stops the operation may be used as the preliminary printing device 20B in another print process delayed from the planned print process 38.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents. For example, the order of processing may be changed to the extent that the gist of the present invention does not deviate.

In the present exemplary embodiment, a form in which print management processing is performed by software is described as an example, but the processing which is the same as in the flowchart illustrated in FIGS. 10 to 13 may be performed by software stored in, for example, an application specific integrated circuit (ASIC). In this case, the processing speed may be improved compared to a case where the print management processing is performed by software.

In the above-described exemplary embodiments, a form in which a print management program is installed in the ROM 42 is described, and the present invention is not limited to this. The print management program according to the present invention may also be provided in a form recorded in a computer readable storage medium. For example, the print management program according to the present invention may be provided in a form recorded on an optical disk such as a compact disc (CD)-ROM or a digital versatile disc (DVD)-ROM. In addition, the print management program according to the present invention may be provided in a form recorded in a semiconductor memory such as a Universal Serial Bus (USB) memory and a flash memory. Furthermore, the print management device 10 may acquire the print management program according to the present invention from another device connected to the communication line 2.

What is claimed is:

1. A print management device comprising a processor and memory programmed to perform the following:
   estimate a completion prediction time of a present print process that is planned in advance according to a processing capability of a printing device, the estimating in response to occurrence of an abnormality in the printing device when printing is being performed by the printing device,
   calculate an actual performance value of the processing capability of the printing device, the actual performance value calculated after the present print process starts and is calculated after a start of printing of the present print process by the printing device to the occurrence of the abnormality, and
   store in memory a recovery time determined in advance that represents an amount of time needed for dealing with the abnormality; and
   notify a user of the completion prediction time,
   wherein the completion prediction time is based on the calculated actual performance value for the present print process, and the recovery time determined in advance, and
   wherein the actual performance value is independently calculated for each respective print process.

2. The print management device according to claim 1, wherein the recovery time is calculated based on a statistical value obtained by statistical analysis of records of time needed to deal with the abnormality at previous occurrences of the abnormality.

3. The print management device according to claim 2, wherein the statistical value is obtained by statistical analysis of records of time needed to deal with the abnormality at previous occurrences of the abnormality in a plurality of printing devices including the printing device.

4. The print management device according to claim 3, wherein the recovery time varies according to one or more workers who deal with the abnormality.

5. The print management device according to claim 2, wherein the recovery time varies according to one or more workers who deal with the abnormality.

6. The print management device according to claim 1, wherein the recovery time varies according to one or more workers who deal with the abnormality.

7. The print management device according to claim 6, wherein the one or more workers who deal with the abnormality include a plurality of workers, and
   the processor estimates the completion prediction time based on a number of the plurality of workers and the recovery time of each of the plurality of workers.

8. The print management device according to claim 1, wherein the recovery time is set with respect to a type of the abnormality.

9. The print management device according to claim 1, wherein the abnormality causes a delay in a period during which the print process is performed.

10. The print management device of claim 1, wherein the actual performance is based on print speed data collected after the present print process starts from start of printing of the present print process by the printing device to the occurrence of the abnormality.

11. A print management device comprising a processor and memory programmed to perform the following:
    estimate a completion prediction time of a present print process in a case where, in the print process including printing by at least one first printing device which is assigned to the printing in advance, at least one second printing device which is different from the at least one first printing device is assigned to the printing in addition to the at least one first printing device for the print process,
    calculate an actual performance value of a processing capability of the at least one first printing device the calculation based on data collected from the at least one first printing device from a start of printing of the present print process to a time when the at least one second printing device starts printing in the present print process and statistical information on a processing capability of the at least one second printing device until the second printing device starts the printing in the print process; and
    notify a user of the completion prediction time which is estimated by the processor,
    wherein the actual performance value is independently calculated for each print process.

12. The print management device according to claim 11, wherein the processor selects a printing device having a same characteristic relating to printing as the at least one first printing device among a plurality of printing devices as the second printing device, and estimates the completion prediction time of the print process.

13. The print management device according to claim 12, wherein the characteristic includes at least one of a print method, a type of a recording medium, and a color type used for the printing device.

14. The print management device according to claim 13, wherein the processor notifies that a printing device which is not used over the completion prediction time of the print process which is estimated based on the actual performance information among the plurality of printing devices is at least one candidate for the at least one second printing device, and
    the processor estimates the completion prediction time of the print process based on the actual performance value of the first printing device, and the statistical information on the processing capability of the second printing device which is selected by an administrator from the at least one candidate for the second printing device which is notified by the processor.

15. The print management device according to claim 14, wherein the at least one candidate includes a plurality of candidates, and in a case where the administrator selects a printing device from the plurality of candidates and where there is any other printing device which reduces the completion prediction time of the print process in the plurality of candidates compared to the printing device which is selected by the administrator, the processor notifies the other printing device which reduces the completion prediction time of the print process.

16. The print management device according to claim 12, wherein the processor notifies that a printing device which is not used over the completion prediction time of the print process which is estimated based on the actual performance value among the plurality of printing devices is at least one candidate for the at least one second printing device, and the processor estimates the completion prediction time of the print process based on the actual performance value of the first printing device, and the statistical information on the processing capability of the second printing device which is selected by an administrator from the at least one candidate for the second printing device which is notified by the processor.

17. The print management device according to claim 16, wherein the at least one candidate includes a plurality of candidates, and in a case where the administrator selects a printing device from the plurality of candidates and where there is any other printing device which reduces the completion prediction time of the print process in the plurality of candidates compared to the printing device which is selected by the administrator, the processor notifies the other printing device which reduces the completion prediction time of the print process.

18. The print management device according to claim 11, wherein the processor notifies that a printing device which is not used over the completion prediction time of the print process which is estimated based on the actual performance information among a plurality of printing devices is at least one candidate for the at least one second printing device, and the processor estimates the completion prediction time of the print process based on the calculated actual performance value of the first printing device, and the statistical information on the processing capability of the second printing device which is selected by an administrator from the at least one candidate for the second printing device which is notified by the processor.

19. The print management device according to claim 18, wherein the at least one candidate includes a plurality of candidates, and in a case where the administrator selects a printing device from the plurality of candidates and where there is any other printing device which reduces the completion prediction time of the print process in the plurality of candidates compared to the printing device which is selected by the administrator, the processor notifies the other printing device which reduces the completion prediction time of the print process.

20. A non-transitory computer readable medium storing a program causing a computer to execute a process for print management, the process comprising:

estimate a completion prediction time of a present print process that is planned in advance according to a processing capability of a printing device, the estimating in response to occurrence of an abnormality in the printing device when printing is being performed by the printing device, calculate an actual performance value of the processing capability of the printing device, the actual performance value calculated after the present print process starts and is calculated after a start of printing of the present print process by the printing device to the occurrence of the abnormality, and store in memory a recovery time determined in advance that represents an amount of time needed for dealing with the abnormality; and notify a user of the completion prediction time, wherein the completion prediction time is based on the calculated actual performance value for the present print process, and the recovery time determined in advance, and wherein the actual performance value is independently calculated for each print process.

* * * * *